United States Patent [19]

Kabas et al.

[11] 3,923,677
[45] Dec. 2, 1975

[54] 2-STILBENYL-4-STYRYL-V-TRIAZOLES, THEIR USE FOR THE OPTICAL BRIGHTENING OF ORGANIC MATERIALS, AND PROCESSES FOR THEIR MANUFACTURE

[75] Inventors: Guglielmo Kabas, Binningen; Hans Schlaepfer, Basel; Ian John Fletcher, Muenchenstein, all of Switzerland

[73] Assignee: Ciba-Geigy AG, Basel, Switzerland

[22] Filed: Oct. 24, 1974

[21] Appl. No.: 517,697

Related U.S. Application Data

[62] Division of Ser. No. 237,204, March 22, 1972, Pat. No. 3,862,179.

[30] Foreign Application Priority Data

Mar. 31, 1971 Switzerland.......................... 4702/71

[52] U.S. Cl................................ 252/89; 252/301.2
[51] Int. Cl.²............................................. C11D 3/42
[58] Field of Search...................... 252/89, 301.2 W; 260/240 R

[56] References Cited
UNITED STATES PATENTS

| | | | |
|---|---|---|---|
| 3,453,268 | 7/1969 | Dorlars et al....................... | 260/240 |
| 3,511,834 | 5/1970 | Siegrist et al....................... | 260/240 |
| 3,579,511 | 5/1971 | Weber et al. ....................... | 260/240 |
| 3,642,783 | 2/1972 | Siegrist et al....................... | 260/240 |
| 3,689,429 | 9/1972 | Duebel et al................ | 252/301.2 W |

*Primary Examiner*—William E. Schulz
*Attorney, Agent, or Firm*—Joseph G. Kolodny; Edward McC. Roberts; Prabodh I. Almaula

[57] ABSTRACT

The present invention relates to detergents containing 0.001 to 0.5% by weight of new v-triazoles of the formula

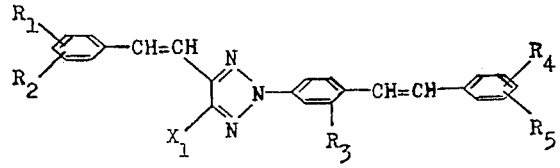

wherein $X_1$ denotes hydrogen, halogen, methyl or optionally substituted phenyl, $R_1$ denotes hydrogen, halogen, alkyl with 1 to 4 carbon atoms, optionally substituted phenyl or alkoxy with 1 to 4 carbon atoms, or together with $R_2$ in the o-position denotes a fused benzene ring, $R_2$ denotes hydrogen, halogen, alkyl with 1 to 4 carbon atoms or alkoxy with 1 to 4 carbon atoms, or together with $R_1$ in the o-position denotes a fused benzene ring, $R_3$ denotes hydrogen, a nitrile group, an optionally functionally modified sulpho group or an optionally functionally modified carboxyl group, $R_4$ denotes hydrogen, halogen, a nitrile group, alkyl with 1 to 4 carbon atoms, optionally substituted phenyl, alkoxy with 1 to 4 carbon atoms, optionally functionally modified carboxyl or an optionally functionally modified sulpho group and $R_5$ denotes hydrogen, alkyl with 1 to 4 carbon atoms or alkoxy with 1 to 4 carbon atoms.

The detergent compositions can be used for brightening textiles.

3 Claims, No Drawings

2-STILBENYL-4-STYRYL-V-TRIAZOLES, THEIR USE FOR THE OPTICAL BRIGHTENING OF ORGANIC MATERIALS, AND PROCESSES FOR THEIR MANUFACTURE

This is a Division of application Ser. No. 237,204, filed on Mar. 22, 1972 and now U.S. Pat. No. 3,862,179.

The present invention relates to the new v-triazoles, the use of these triazoles for the optical brightening of synthetic or natural organic materials, and the process for the manufacture of the compounds.

The new v-triazoles correspond to the formula (1)

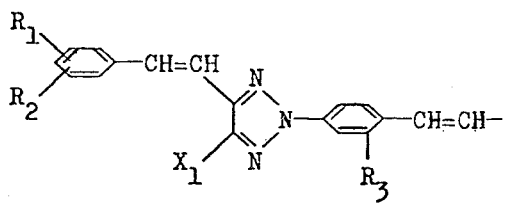

,

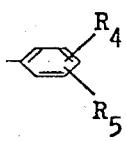

, wherein $X_1$ denotes hydrogen, halogen, methyl or optionally substituted phenyl, $R_1$ denotes hydrogen, halogen, alkyl with 1 to 4 carbon atoms, optionally substituted phenyl or alkoxy with 1 to 4 carbon atoms, or together with $R_2$ in the o-position denotes a fused benzene ring, $R_2$ denotes hydrogen, halogen, alkyl with 1 to 4 carbon atoms or alkoxy with 1 to 4 carbon atoms, or together with $R_1$ in the o-position denotes a fused benzene ring, $R_3$ denotes hydrogen, a nitrile group, an optionally functionally modified sulpho group or an optionally functionally modified carboxyl group, $R_4$ denotes hydrogen, halogen, a nitrile group, alkyl with 1 to 4 carbon atoms, optionally substituted phenyl, alkoxy with 1 to 4 carbon atoms, optionally functionally modified carboxyl or an optionally functionally modified sulpho group and $R_5$ denotes hydrogen, alkyl with 1 to 4 carbon atoms or alkoxy with 1 to 4 carbon atoms.

The terms "optionally functionally modified carboxyl" and "optionally functionally modified sulpho group" can in general by expressed by the partial formulae —COOZ and —CON($Z_1Z_2$), or —$SO_3Z$, —$SO_2Z_3$ and —$SO_2N(Z_1Z_2)$ respectively; herein, Z denotes hydrogen, alkyl with 1 to 18, preferably 1 to 4, carbon atoms, optionally substituted phenyl or benzyl, $Z_1$ denotes hydrogen, alkyl with 1 to 6, preferably 1 to 4, carbon atoms, wherein the terminal carbon atom can be substituted by a dialkylamino group with 1 to 4 carbon atoms per alkyl part, or optionally substituted phenyl, $Z_2$ denotes hydrogen, alkyl with 1 to 6, preferably 1 to 4, carbon atoms, or together with $Z_1$ and the nitrogen atom denotes a morpholino radical which is optionally substituted by alkyl with 1 to 4 carbon atoms, and $Z_3$ denotes alkyl with 1 to 4 carbon atoms or optionally substituted phenyl. Furthermore Z, in particular in the case of the sulpho group, represents an alkali metal atom, especially sodium, the ammonium group or an amine.

Preferred halogens (for the symbols $X_1$, $R_1$, $R_2$, $R_3$ and $R_4$) are bromine and especially chlorine.

As alkyl radicals with 1 to 4 carbon atoms (for the symbols $R_1$ and $R_2$), tert. butyl, n-butyl, propyl, ethyl and especially methyl may be mentioned as examples.

Preferred alkyl groups with 1 to 4 carbon atoms are methyl, ethyl and tert. butyl.

Tert. butyl, ethyl, methyl, ethoxy, methoxy and chlorine are preferred as substituents for the phenyl radicals of the symbols $X_1$, $R_1$, $R_4$ and Z.

The formula (1) for example includes the compounds of the formula (2)

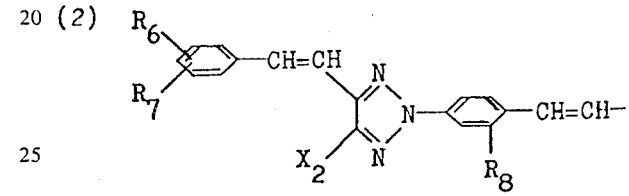

,

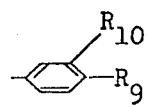

, wherein $X_2$ denotes hydrogen or chlorine, $R_6$ denotes hydrogen, chlorine, bromine, alkyl with 1 to 4 carbon atoms or phenyl, $R_7$ denotes hydrogen, chlorine, alkyl with 1 to 4 carbon atoms or alkoxy with 1 to 4 carbon atoms, $R_8$ denotes hydrogen, a nitrile group, an optionally functionally modified sulphonic acid group or an optionally functionally modified carboxyl group, $R_9$ denotes hydrogen, chlorine, alkyl with 1 to 4 carbon atoms, alkoxy with 1 to 4 carbon atoms, phenyl, optionally functionally modified carboxyl or an optionally functionally modified sulpho group and $R_{10}$ denotes hydrogen, alkyl with 1 to 4 carbon atoms or alkoxy with 1 to 4 carbon atoms.

Preferred 2-stilbenyl-4-styryl-v-triazoles correspond to the formula (3)

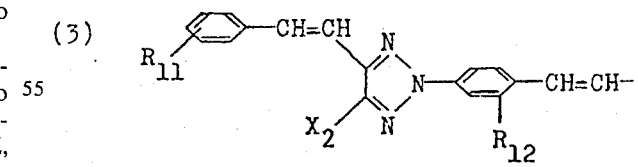

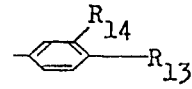

wherein $X_2$ denotes hydrogen or chlorine, $R_{11}$ denotes hydrogen, alkyl with 1 to 4 carbon atoms, chlorine, methoxy or phenyl, $R_{12}$ denotes carbonamido, a nitrile group, a sulpho group or its sodium salt, —$SO_2Y$, wherein Y represents methyl, ethyl, methoxy, ethoxy, phenoxy optionally substituted by alkyl with 1 to 4 carbon atoms or an alkylamino group with 1 to 4 carbon atoms, wherein the terminal carbon atom can be substituted by a dialkylamino group with 1 or 2 carbon atoms per alkyl part, $R_{13}$ denotes hydrogen, chlorine, methyl, methoxy, phenyl, carbonmethoxy or carbethoxy and $R_{14}$ denotes hydrogen or methoxy.

The radical $R_{11}$ is in general in the meta-position or especially in the para-position to the ethylene bridge.

The compounds of the formula (1), wherein $X_1$ denotes hydrogen, methyl or optionally substituted phenyl, are manufactured if one mol of water is eliminated under the action of an acid condensation agent, and optionally with heating, from a compound of the formula (4) 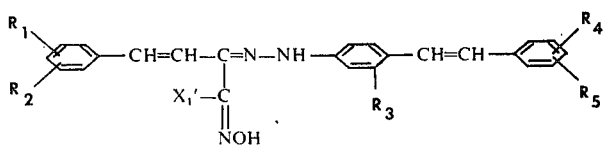

where $X_1'$ represents hydrogen, methyl or optionally substituted phenyl and $R_1$, $R_2$, $R_3$, $R_4$ and $R_5$ have the indicated meaning.

As examples of acid condensation agents there may be mentioned the hydrogen halide acids, the inorganic anhydrides, phosphorus pentoxide and sulphur trioxide, the mixed inorganic-organic anhydrides, such as the alkanoyl and aroyl, alkylsulphonyl and arylsulphonyl halides, for example acetyl chloride, benzoyl chloride and toluenesulphochloride, as well as the purely organic anhydrides, such as acetic anhydride, benzoic anhydride and also the mixed anhydride of formic acid and acetic acid.

The condensation can be carried out in the presence of organic solvents which are inert under the reaction conditions. As such, it is possible to use high-boiling hydrocarbons and halogenated hydrocarbons, for example chlorobenzene, dichlorobenzene, and xylene; it is also possible to use inert slightly basic or more strongly basic solvents, for example dimethylformamide, dimethylacetamide or pyridine, picolines and quinolines. Depending on the substituents of the oximehydrazones, the cyclisation can be effected by simply leaving the reaction mixture to stand or by heating the reaction mixture. Possible reaction temperatures are temperatures between room temperature and 250°C, preferably 100° to 150°C. In some cases, the presence of basic catalysts, such as anhydrous alkali salts or alkaline earth salts of organic acids, for example sodium acetate or potassium acetate, brings favourable results as regards the yields and purity of the end products. The progress of the cyclisation reaction can best be followed in thin layer chromatograms. The transient occurrence of O-acylated intermediate stages in the case where mixed inorganic-organic or purely organic acid anhydrides are used, is of only insignificant importance for the course of the reaction.

As a modification of the process just described, the compounds mentioned are also obtained by bringing about the cyclisation in a compound of the formula (4) oxidatively and reducing the resulting v-triazole-1-oxide compound with nascent hydrogen to give a compound of the formula (1).

The oxidative cyclisation can be effected by the action of the most diverse oxidising agents; at the same time, it is advisable to work in oxidation-resistant solvents. In basic solvents, such as pyridine or pyridine-water mixtures, potassium ferricyanide can for example be used. The generally applicable and therefore preferred process is the oxidation with cupric sulphate in pyridine-water. For this, it is not necessary to use stoichiometric amounts of copper, because the monovalent copper produced during the reaction can constantly be reconverted to the divalent stage during the reaction by blowing in air or oxygen. The oxidation with cupric salts, such as cupric sulphate or cupric chloride, can advantageously also be carried out in methanol or methanol/water, in the presence of ammonium salts or amine salts.

The reduction with base metals and acids, such as zinc dust in acetic acid or acetic acid-water mixtures, is advantageously chosen for the reduction of the triazole-oxides to the triazoles in accordance with known methods. However, salts of reducing acids of sulphur or phosphorus can also be used for the reduction.

The route via the triazole-oxide is particularly indicated for the manufacture of compounds of the formula (1), wherein $X_1$ represents halogen. The halogenation and the reduction of the oxide to the end product can in that case be carried out in one step.

The starting substances for the manufacturing process according to the invention, or for the modified process, can be obtained in a known manner.

A compound of the formula (4) can be manufactured, for example, by reaction of a diketone of the formula (5) 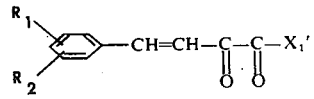

wherein $R_1$, $R_2$ and $X_1'$ have the abovementioned meaning, with a compound of the formula (6) 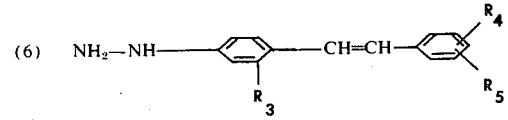

wherein $R_3$, $R_4$ and $R_5$ have the abovementioned meaning, and with hydroxylamine, in optional sequence, or by nitrosylation of a monoketone of the formula (7) 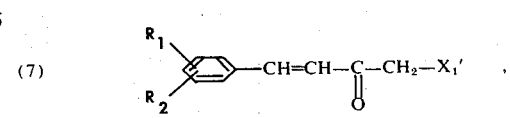

wherein $R_1$, $R_2$ and $X_1'$ have the abovementioned meaning, and reaction of the resulting oxime of the formula (8) 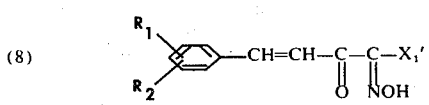

with a compound of the formula (6) or by coupling of the diazotised compound of the formula (9) 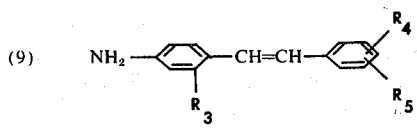

wherein $R_3$, $R_4$ and $R_5$ have the abovementioned meaning, with a ketone of the formula (7) or with a keto-aldehyde of the formula

(10) 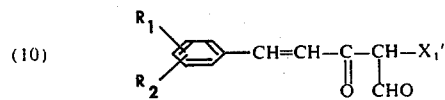

wherein $R_1$, $R_2$ and $X_1'$ have the indicated meaning, and reaction of the azo compound with hydroxylamine.

The introduction of functionally modified carboxyl groups and sulpho groups (especially for $R_3$) is advantageously only carried out on the triazole compound, in accordance with known methods.

The compounds according to the invention are distinguished by good compatibility with high molecular, organic substances. The new optical brighteners are suitable for the whitening of high molecular materials, such as polyolefines, for example polyethylene or polypropylene, and also polyvinyl chloride and polyacrylonitrile, but above all polyesters, especially polyesters of aromatic polycarboxylic acids with polyhydric alcohols, such as polyterephthalic acid glycol esters, synthetic polyamides, such as nylon-6 and nylon-66, and also cellulose esters, such as cellulose acetates, and alsl cellulose. Those compounds which contain groups which confer solubility in water, such as, for example, the sulphonic acid group, are especially suitable for brightening cellulose substrates.

The optical brightening of the high molecular colourless organic material is for example effected by incorporating therein small amounts of optical brighteners according to the invention, for example 0.0001 to 2%, preferably 0.0005 to 0.5%, relative to the material to be brightened, optionally together with other additives, such as plasticisers, stabilisers or pigments. The brighteners can for example be incorporated into the plastics as solutions in plasticisers, such as dioctyl phthalate, or together with stabilisers, such as dibutyl tin dilaurate or sodium pentaoctyl-tripolyphosphate, or together with pigments such as, for example, titanium dioxide. Depending on the nature of the material to be brightened, the brightener can also be dissolved in the monomers before polymerisation, in the polymer composition or, together with the polymers, in a solvent. The material pre-treated in this way is thereafter converted to the desired final shape in accordance with processes which are in themselves known, such as calendering, pressing, extrusion, spreading, casting and above all spinning and stretching. The brighteners can also be incorporated into finishes, for example into finishes for textile fibres, such as polyvinyl alcohol, or into resins or resin precondensates such as, for example, methylol compounds of ethyleneurea, which are used for the treatment of textiles.

Preferably, colourless, high molecular organic material is also brightened in the form of fibres. A dispersion or solution of v-triazoles of the formula (1) according to the invention is advantageously used for the brightening of these fibre materials. The brightener dispersion or solution here preferably contains 0.005 to 0.5% of the v-triazole according to the invention, relative to the fibre material. In addition, the dispersion or solution can contain auxiliaries, such as dispersing agents, for example condensation products of fatty alcohols, possessing 10 to 18 carbon atoms, or alkylphenols with 15 to 25 mols of ethylene oxide, or condensation products of alkylmonoamines or polyamines possessing 16 to 18 carbon atoms with at least 10 mols of ethylene oxide, organic acids such as formic, oxalic or acetic acid, detergents, swelling agents such as dichlorobenzenes or trichlorobenzenes, wetting agents such as sulphosuccinic acid alkyl esters, bleaching agents such as sodium chlorite, peroxides or hydrosulphites and, optionally, brighteners of other categories such as, for example, derivatives of stilbene which possess affinity for cellulose.

The brightening of the fibre material with the aqueous brightener treatment bath is effected either by the exhaustion process, at temperatures of, preferably, 30° to 150°C, or by the padding process. In the latter case, the goods are impregnated with a brightener preparation of, for example, 0.2 to 0.5% strength, and are finished by, for example, dry or moist heat treatment, for example by steaming at 2 atmospheres or, after drying, by brief dry heating to 180° to 220°C, in the course of which the fabric is at the same time thermofixed, if appropriate. The fibre material treated in this way is finally rinsed and dried.

Colourless high molecular organic material optically brightened in accordance with the invention, especially the synthetic fibre material brightened in accordance with the exhaustion process, shows an attractive, pure white, blue-violet to bluish-tinged fluorescent appearance; material of this nature dyed in light colour shades and whitened according to the invention is distinguished by a pure colour shade.

The v-triazoles of the formula (1), according to the invention, can also be added to detergents, and the latter can be used for brightening textiles.

The content of optical brightener of the detergents is advantageously 0.001 to 0.5% by weight, relative to the solids content of the detergent.

Washing liquors which contain v-triazoles of the formula (1) according to the invention, when used for washing, impart a brilliant appearance in daylight to the textile fibres treated with the liquors, for example cellulose fibres or synthetic polyamide, polyester, polyolefine and cellulose ester fibres. They can therefore in particular be used for washing these synthetic fibres or the textiles or constituents of textiles consisting of such fibres, and for washing laundry.

EXAMPLE 1

A suspension of 27.1 g of 4-hydrazino-2-cyano-stilbenehydrochloride and 21 g of benzalisonitrosoacetone in 200 ml of methanol, 80 ml of glacial acetic acid, 80 ml of water and 20.2 g of triethylamine is stirred for 4 hours at room temperature and 6 hours at 60°C. Thereafter the reaction mixture is cooled to 10°C and filtered and the filtered residue is washed with methanol/water. After drying, 29.5 g, corresponding to 76.5% of theory, of hydrazone-oxime, of melting point 194° to 195°C, are obtained.

A mixture of 39.2 g of the hydrazone-oxime and 29.4 g of anhydrous potassium acetate in 120 ml of dimethylformamide is warmed to 40°C. 51 g of acetic anhydride are added dropwise at this temperature over the course of 30 minutes, whereupon the temperature rises to 75°C. The reaction mixture is then brought to 105°C and is stirred for 4 hours at this temperature and then for 1 hour at 140°C. After cooling, the product is filtered off, washed with cooled methanol and subsequently with water until the filtrate reacts neutral, and is then dried.

After repeated recrystallisation from chlorobenzene with the aid of fuller's earth, 27 g, corresponding to 72.3% of theory, of the compound of the formula (11)

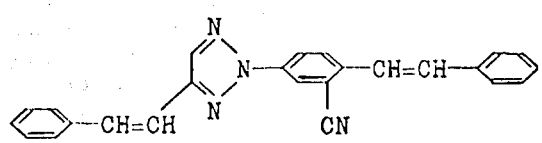

(11)

are obtained as a white powder of melting point 172° to 173°C.

The compound thus obtained is an excellent agent for brightening plastics and synthetic fibres.

The compounds of the formula (12) listed in table I are manufactured analogously. They have similar properties to the abovementioned product.

(12)

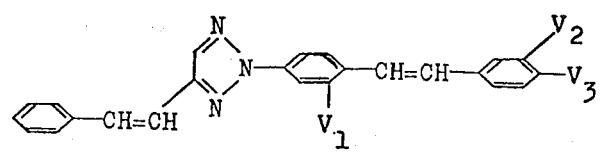

Table I

| Formula | $V_1$ | $V_2$ | $V_3$ | Melting point, uncorrected, in °C |
|---|---|---|---|---|
| (13) | —CN | —H | —OCH$_3$ | 186 – 188 |
| (14) | —CN | OCH$_3$ | —OCH$_3$ | 163 – 164 |
| (15) | —CN | —H | —CH$_3$ | 163 – 165 |

Table I-continued

| Formula | $V_1$ | $V_2$ | $V_3$ | Melting point, uncorrected, in °C |
|---|---|---|---|---|
| (16) | —CN | —H | —Cl | 200 – 203 |
| (17) | —CN | —H | —C$_6$H$_5$ | 204 – 205 |
| (18) | —CN | —H | —COOC$_2$H$_5$ | 182 – 183 |
| (19) | —CONH$_2$ | —H | —H | 266 – 268 |
| (20) | —SO$_2$—NHC$_2$H$_5$ | —H | —H | 197 – 198 |
| (21) | —SO$_2$—CH$_3$ | —H | —H | 182 – 183 |
| (22) | —SO$_2$C$_2$H$_5$ | —H | —H | 188 – 189 |
| (23) | —SO$_2$CH$_3$ | —H | —CH$_3$ | 200 – 201 |

If instead of benzalisonitrosoacetone an equivalent amount of the isonitrosoacetone derivatives listed below, such as o-chlorobenzal-isonitrosoacetone, m-chlorobenzal-isonitrosoacetone, p-chlorobenzal-isonitrosoacetone, p-methylbenzal-isonitrosoacetone, p-methoxybenzal-isonitrosoacetone or p-tert. butylbenzal-isonitrosoacetone is used and in other respects the same procedure as described above is followed, the brighteners of the formula (24) listed in table II below are obtained, which can be used in the same manner:

(24)

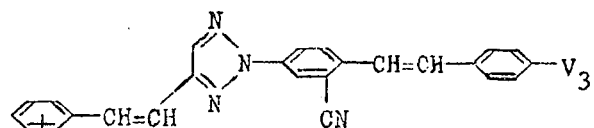

Table II

| Formula | V | $V_3$ | Melting point in °C (uncorrected) |
|---|---|---|---|
| (25) | 4—CH$_3$ | —COOC$_2$H$_5$ | 212 – 215 |
| (26) | 4—Cl | —COOC$_2$H$_5$ | 206 – 207 |
| (27) | 3—Cl | —COOC$_2$H$_5$ | 188 – 189 |
| (28) | 2—Cl | —COOC$_2$H$_5$ | 208 – 209 |
| (29) | 4—OCH$_3$ | —COOC$_2$H$_5$ | 210 – 211 |
| (30) | 4—C(CH$_3$)$_3$ | —COOC$_2$H$_5$ | 196 – 197 |
| (31) | 4—Cl | —H | 182 – 184 |
| (32) | 3—Cl | —H | 170 – 171 |
| (33) | 2—Cl | —H | 165 – 166 |
| (34) | 4—C(CH$_3$)$_3$ | —H | 174 – 176 |
| (35) | 4—CH$_3$ | —H | 198 – 199 |
| (36) | 4—OCH$_3$ | —H | 179 – 181 |

The 4-hydrazino-2-cyanostilbene-hydrochloride used above is obtained as follows:

A suspension of 220 g of 4-amino-2-cyanostilbene, 500 ml of water and 800 g of coarse quartz sand is vigorously stirred for 18 hours at room temperature. The fine suspension is diluted with 2,000 ml of water, the quartz sand is filtered off, 255 ml of hydrochloric acid are added and diazotisation is carried out with 69 g of sodium nitrite in 300 ml of water at 0° to 5°C. A viscous, orange diazo suspension is produced, which is allowed to complete diazotisation for 2 hours at 5° to 8°C. The diazonium salt suspension thus obtained is added dropwise, over the course of 40 minutes, to a suspension of 302 g of sodium sulphite and 24 g of sodium pyrosulphite in 700 ml of water at 20° to 25°C.

The pH value is kept at 7.3 by adding dilute sodium hydroxide solution. An ochre-coloured suspension is produced, which is allowed to complete reaction by stirring for 30 minutes at 20° to 25°C. Thereafter the reaction mixture is heated to 70°C, whilst maintaining the pH value at 7.3 by adding hydrochloric acid, and is stirred for 4 hours at this temperature. The cloudy solution of the hydrazine-N-disulphonic acid is clarified and run into a mixture of 600 ml of hydrochloric acid and 200 ml of water pre-warmed to 60°C, whereupon the hydrazine hydrochloride precipitates as a brownish product. The mixture is subsequently stirred for 6 hours at 70° to 75°C and cooled to 20°C, and the product is filtered off.

After drying, 200 g, corresponding to 74% of theory, of 4-hydrazino-2-cyanostilbene hydrochloride of melting point 195° to 197°C (with decomposition) are obtained.

The hydrazine hydrochlorides of the formula

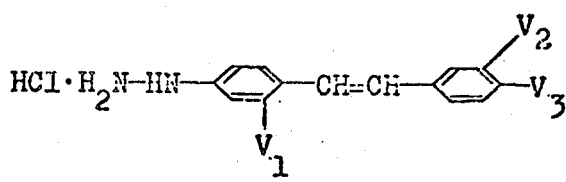

listed in table III below are manufactured in a similar manner.

Table III

| Formula | $V_1$ | $V_2$ | $V_3$ | Melting point in °C (uncorrected) |
|---|---|---|---|---|
| (38) | —CN | —H | —OCH$_3$ | 176 – 180 w.d. |
| (39) | —CN | —OCH$_3$ | —OCH$_3$ | 204 – 206 w.d. |
| (40) | —CN | —H | —CH$_3$ | 195 – 200 w.d. |
| (41) | —CN | —H | —Cl | 208 – 212 w.d. |
| (42) | —CN | —H | —C$_6$H$_5$ | 182 – 183 w.d. |
| (43) | —CN | —H | —COOC$_2$H$_5$ | 150 – 155 w.d. |
| (44) | —CO—NH$_2$ | —H | —H | 212 – 214 w.d. |
| (45) | —SO$_2$NHC$_2$H$_5$ | —H | —H | 128 – 137 w.d. |
| (46) | —SO$_2$CH$_3$ | —H | —H | 206 – 208 w.d. |
| (47) | —SO$_2$C$_2$H$_5$ | —H | —CH$_3$ | 184 – 186 w.d. |
| (48) | —SO$_2$CH$_3$ | —H | —CH$_3$ | 201 – 204 w.d. | w.d. = with decomposition

EXAMPLE 2

A suspension of 27.1 g of 4-hydrazino-2-cyanostilbene hydrochloride and 21 g of benzalisonitrosoacetone in 200 ml of methanol, 80 ml of glacial acetic acid, 80 ml of water and 20.2 g of triethylamine is stirred for 4 hours at room temperature and 6 hours at 60°C. 11.5 g of ammonium acetate and 25.5 g of cupric chloride are now added and the mixture is boiled for a further 24 hours under reflux. Thereafter the reaction mixture is cooled to 10°C and filtered, and the filter residue is washed with dilute hydrochloric acid and methanol. After drying, 37.1 g, corresponding to 95% of theory, of 2-(2-cyano-stilb-4-yl)-5-styryl-v-triazole-3-oxide, of melting point 190° to 193°C, are obtained.

39.0 g of the triazole-oxide manufactured in this way, 26 g of zinc powder and 60 g of glacial acetic acid in 400 ml of chlorobenzene are warmed to 100°C over the course of 2 hours and vigorously stirred for 24 hours at this temperature. The reaction mixture is thereafter filtered hot and the chlorobenzene is distilled off in steam. The crude v-triazole which remains is repeatedly recrystallised from chlorobenzene with the aid of fuller's earth. The compound of the formula (11) is thus obtained.

If instead of the 27.1 g of 4-hydrazino-2-cyanostilbene hydrochloride equivalent amounts of the stilbenehydrazine hydrochlorides of the formulae (38) to (48) are used, and otherwise the same procedure is followed, the 2-stilbyl-4-styryl-v-triazoles of the formulae (13) to (23) are obtained.

EXAMPLE 3

39 g of 2-(2-cyanostilb-4-yl)-5-styryl-v-triazole-3-oxide, manufactured as described in the first paragraph of Example 2, in a mixture of 1,000 ml of dioxane and 200 ml of water, are brought to the reflux temperature. On reaching the boiling point, hydrochloric acid gas is passed in for 8 hours, 300 ml of water are thereafter added and the reaction mixture is then cooled. The resulting crystalline precipitate is filtered off and washed with methanol. After three recrystallisations from chlorobenzene with the aid of fuller's earth, the compound of the formula (49)

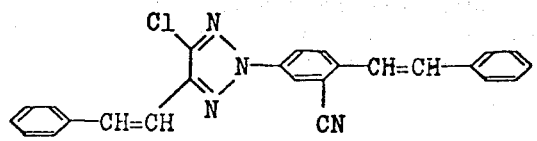

is obtained in the form of light yellow crystals of melting point 189° to 191°C, which dissolve in chlorobenzene to give an intense blue-violet fluorescence.

The compound imparts a brilliant white effect to fibres of polyesters, polyamides and polypropylene. It can also be added, with good success, to spinning compositions.

Compounds of the formula (50) which have a similar effect are obtained if, whilst otherwise using the same procedure, equivalent amounts of 2-substituted 5-styryl-v-triazole-3-oxides (50)

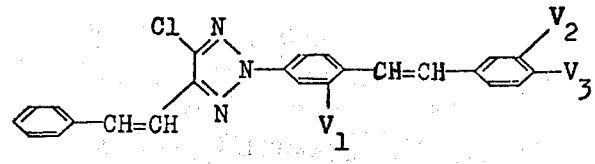

are used instead of the 39 g of 2-(2-cyanostilb-4-yl)-5-styryl-v-triazole-3-oxide Table IV

| Formula | V₁ | V₂ | V₃ | Melting point in °C (uncorrected) |
|---|---|---|---|---|
| (51) | —CN | —H | —OCH₃ | 216 – 218 |
| (52) | —CN | —OCH₃ | —OCH₃ | 193 – 194 |
| (53) | —CN | —H | —CH₃ | 183 – 184 |
| (54) | —CN | —H | —Cl | 235 – 236 |
| (55) | —CN | —H | —C₆H₅ | 190 – 191 |
| (56) | —CN | —H | —COOC₂H₅ | 167 – 168 |
| (57) | —CO—NH₂ | —H | —H | 290 – 292 |
| (58) | —SO₂NH—C₂H₅ | —H | —H | 220 – 222 |
| (59) | —SO₂CH₃ | —H | —H | 233 – 234 |
| (60) | —SO₂C₂H₅ | —H | —CH₃ | 175 – 176 |
| (61) | —SO₂CH₃ | —H | —CH₃ | 222 – 224 |

If instead of benzalisonitrosoacetone an equivalent amount of the isonitrosoacetone derivatives listed below, such as o-chlorobenzal-isonitrosoacetone, m-chlorobenzalisonitrosoacetone, p-chlorobenzal-isonitrosoacetone, p-methylbenzal-isonitrosoacetone, p-methoxybenzal-isonitrosoacetone or p-tert. butylbenzal-isonitrosoacetone is used, and in other respects the same procedure as described above is followed, the brighteners of the formula

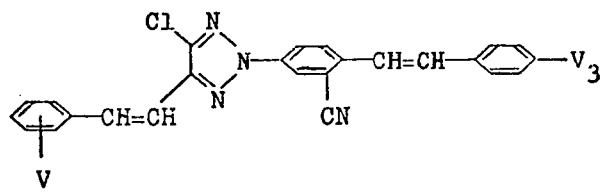

(62)

listed in table V below are obtained, which can be used in the same manner.

Table V

| Formula | V | V₃ | Melting point in °C (uncorrected) |
|---|---|---|---|
| (63) | 4—Cl | —COOC₂H₅ | 204 – 205 |
| (64) | 3—Cl | —COOC₂H₅ | 160 – 161 |
| (65) | 2—Cl | —COOC₂H₅ | 180 – 183 |
| (66) | 4—OCH₃ | —COOC₂H₅ | 181 – 182 |
| (67) | 4—C(CH₃)₃ | —H | 172 – 173 |
| (68) | 4—CH₃ | —H | 185 – 187 |
| (69) | OCH₃ | —H | 172 – 174 |

EXAMPLE 4

29 g of 4-hydrazinostilbene-2-sulphonic acid are suspended in 400 ml of water and 1 ml of approx. 40% strength sodium sulphite solution at 40°C. The pH value is adjusted to 10 by adding ammonia. A solution of 21 g of benzalisonitrosoacetone in 400 ml of methanol is rapidly added and the pH value is adjusted to 6.0 by adding acetic acid. The red-brown suspension is stirred for 20 hours at 30°C and thereafter the bulk of the methanol is distilled off under reduced pressure. The mixture is now cooled to 20°C and adjusted to a pH value of 2 with concentrated hydrochloric acid, and the product is filtered off, washed with 10% strength sodium chloride solution and dried in vacuo at 40°C.

47 g of the oxime-hydrazone thus produced, in 700 ml of acetic anhydride, 10 g of anhydrous sodium acetate and 20 ml of dimethylformamide are heated to 104°C over the course of 3 hours and stirred at this temperature for 8 hours. The mixture is then evaporated in vacuo, the residue is boiled up with 100 ml of water and 20 ml of sodium hydroxide solution and cooled, and the product is salted out and filtered off. This salt, of the formula

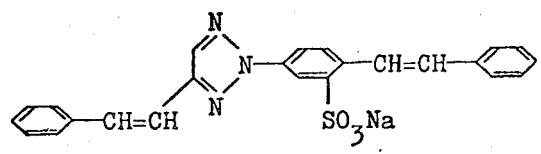

(70)

is then purified by repeated redissolving and reprecipitation from 5% strength sodium chloride solution and a little bleach solution, after which a yellow powder is obtained.

If instead of benzalisonitrosoacetone an equivalent amount of the isonitrosoacetone derivatives listed below, such as o-chlorobenzal-isonitrosoacetone, m-chlorobenzal-isonitrosoacetone, p-chlorobenzal-isonitrosoacetone, p-methylbenzal-isonitrosoacetone, p-tert. butylbenzal-isonitrosoacetone, p-methoxybenzal-isonitrosoacetone or p-phenylbenzal-isonitrosoacetone is used and in other respects the same procedure as described above is followed, the brighteners of the formula

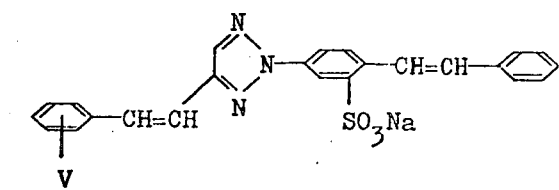

(71)

are obtained, which can be used in the same manner. V = 2-Cl, 3-Cl, 4-Cl, 4-CH₃, 4-C(CH₃)₃, 4-OCH₃ or 4-C₆H₅.

EXAMPLE 5

44.8 g of 4-(4-styryl-v-triazole-2-yl)-stilbene-2-sulphochloride are suspended in 800 ml of dry chlorobenzene and the suspension is cooled to −5°C. 13.5 g of ethylamine are passed in at this temperature and thereafter the mixture is stirred for 6 hours at 10° to 15°C and 3 hours at 130° to 135°C. After adding 50 ml of a saturated sodium carbonate solution, the mixture is steam-distilled. The residue is filtered off, washed with water and dried. After repeated recrystallisation from chlorobenzene with the aid of fuller's earth, 32.9 g, corresponding to 72% of theory, of the compound of the formula (20) of melting point 197 to 198°C are obtained.

If instead of 13.5 g of ethylamine an equivalent amount of 3-dimethylamino-1-propylamine is used and otherwise the same procedure is followed, the compound of the formula

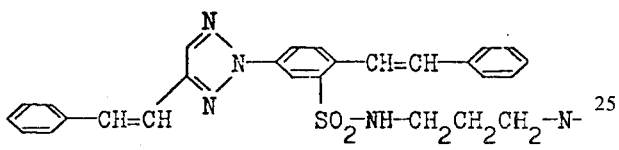

(72)

is obtained. The 4-(4-styryl-v-triazole-2-yl)-stilbene-2-sulphochloride used above is obtained as follows:

205 g of 4-(4-styryl-v-triazole-2-yl)-stilbene-2-sulphonic acid (sodium salt) are introduced into 500 ml of dried chlorobenzene and the temperature is brought to 90° – 100°C. Thereafter 188 g of phosphorus oxychloride are introduced over the course of 30 minutes and the temperature is then raised to 130° – 135°C, whereupon an almost clear solution is slowly produced, with evolution of hydrochloric acid gas. After 6 hours, the bulk of the chlorobenzene as well as the excess phosphorus oxychloride are distilled off under reduced pressure. After cooling, ice and water are added and the sulphonic acid chloride which has precipitated is filtered off, washed with ice water and dried.

EXAMPLE 6

22.3 g of the 4-(4-styryl-v-triazole-2-yl)-stilbene-2-sulphochloride described in Example 5 are introduced into an aqueous solution of 7.5 g of phenol and 5 g of sodium hydroxide over the course of 30 minutes at 60° to 65°C and the mixture is stirred at a pH value of 9 until the reaction is completed. The crude phenol-ester of the formula

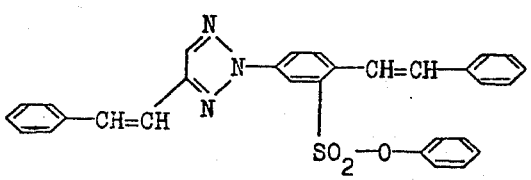

(73)

which is thereby formed is filtered off after cooling, and is dried. After repeated recrystallisation from chlorobenzene with the aid of fuller's earth, a yellowish powder is obtained.

The product is an excellent brightener for various polymeric plastics, such as the polymers and copolymers of vinyl chloride, vinylidene chloride, styrenes and ethylenes. A product of entirely similar action is obtained if in the above example the phenol is replaced by 8.1 g of p-cresol. The compound of the formula

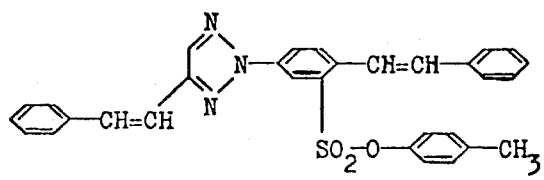

(74)

is then obtained as a yellowish powder.

If the phenol is further replaced by 11.3 g of p-tert. butylphenol, the compound of the formula

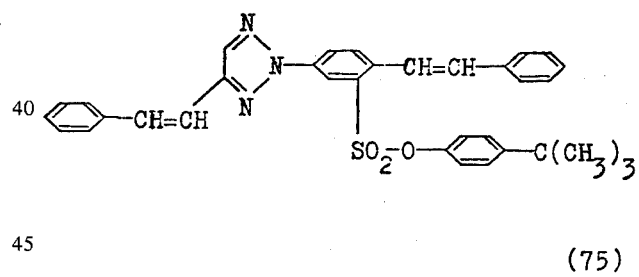

(75)

is obtained as a yellowish powder which is an effective brightener for the most diverse organic polymers.

EXAMPLE 7

0.2 g of Glauber's salt are added to 100 ml of water. A solution of the optical brightener of the formula (70) is manufactured by dissolving 1 g in 1,000 ml of dimethylformamide. 2 ml of this stock solution are added to the solution described above. This aqueous solution containing the brightener is warmed to 40° – 45°C. 3 g of a previously bleached cotton fabric are then introduced into the solution and treated for 30 minutes at this temperature. The fabric is then rinsed for 2 minutes in running cold water and is subsequently dried for 20 minutes at 60°C.

The fabric treated in this way shows a distinct brightening effect.

EXAMPLE 8

0.06 g of alkyl-polyglycol-ether is added to 100 ml of water. A solution of an optical brightener of the formula (11) is manufactured by dissolving 1 g in 1,000 ml of dimethylformamide. 3 ml of this stock solution are added to the solution described above. This aqueous solution or dispersion containing the brightener is warmed to 60°C and 3 g of a nylon fabric are then introduced into the solution. The temperature is raised to 92° – 95°C over the course of 10 to 15 minutes and is left thereat for 30 minutes. The fabric is then rinsed for 2 minutes in running cold water and is subsequently dried for 20 minutes at 60°C.

The fabric treated in this way shows a distinct brightening effect.

If instead of the brightener of the formula (11) the same amounts of an optical brightener of the formulae (15), (17), (19), (49), (53), (55), (58) or (70) are used, and otherwise the same procedure is followed, similar results are obtained.

EXAMPLE 9

0.12 ml of 85% strength formic acid and 0.06 g of alkyl-polyglycol-ether are added to 100 ml of water.

A solution of the optical brightener of the formula (11) is prepared by dissolving 1 g in 1,000 ml of dimethylformamide. 3 ml of this stock solution are added to the solution described above. This aqueous solution or dispersion containing the brightener is warmed to 60°C and 3 g of polyamide fabric are then introduced into the solution. The temperature is raised to 92° – 95°C over the course of 10 to 15 minutes and is left thereat for 30 minutes. The fabric is then rinsed for 2 minutes in running cold water and is subsequently dried for 20 minutes at 60°C.

The fabric treated in this way shows a distinct brightening effect.

If instead of the abovementioned brightener the same amounts of optical brightener of the formulae (15), (17), (19), (49), (53), (54), (55), (58) or (60) are used and otherwise the same procedure is followed, similar effects are obtained.

EXAMPLE 10

0.2 g of trichlorobenzene is added to 100 ml of water.

A solution of the optical brightener of the formula (11) is prepared by dissolving 1 g in 1,000 ml of dimethylformamide. 1.5 ml of this stock solution are added to the solution described above. This aqueous solution containing the brightener is warmed to 60°C and a polyester fabric weighing 3 g is then introduced into the solution. The temperature is raised to 95° – 98°C over the course of 10 to 15 minutes and is left thereat for 1 hour. The fabric is then rinsed for 2 minutes in running cold water and is subsequently dried for 20 minutes at 60°C.

The fabric treated in this way shows a distinct brightening effect.

If instead of the abovementioned brightener the same amounts of an optical brightener of the formula (15), (16), (17), (19), (49), (53), (54) or (58) are used and otherwise the same procedure is followed, similar results are obtained.

EXAMPLE 11

0.2 g of trichlorobenzene, 0.2 g of 80% strength sodium chlorite, 0.2 g of sodium nitrate and 0.2 g of oxalic acid or an equivalent amount of another organic or inorganic acid suitable for this purposes are added to 100 ml of water.

A solution of the optical brightener of the formula (11) is prepared by dissolving 1 g in 1,000 ml of dimethylformamide. 1.5 ml of this stock solution are added to the solution described above. This aqueous solution containing the brightener is warmed to 60°C and 3 g of a polyester fabric are then introduced into the solution. The temperature is raised to 95° – 98°C over the course of 15 to 20 minutes and is left thereat for 60 minutes. The fabric is then rinsed for 2 minutes in running cold water and is subsequently dried for 20 minutes at 60°C.

The fabric treated in this way shows a distinct brightening effect.

If instead of the abovementioned brightener the same amounts of an optical brightener of the formula (15), (16), (17), (19), (49), (53), (54) or (58) are used and otherwise the same procedure is followed, similar effects are obtained.

EXAMPLE 12

A solution of the optical brightener of the formula (11) is prepared by dissolving 1 g in 1,000 ml of dimethylformamide. A polyester fabric is padded with this solution (20°C) (squeezing-out effect 50 to 60%, roller pressure 30 kg/cm$^2$, speed 3 m/minute). The fabric is subsequently fixed for 30 seconds at 200°C.

The fabric treated in this way shows a distinct brightening effect.

If instead of the abovementioned brightener the same amounts of an optical brightener of the formulae (15), (16), (17), (18), (19), (49), (53), (55), (56) or (58) are used and otherwise the same procedure is followed, similar effects are obtained.

EXAMPLE 13

0.4 g of detergent of the following composition is added to 100 ml of water:
  15.2% of dodecylbenzenesulphonate
  3.8% of dodecyl alcohol sulphonate
  25.6% of Na tripolyphosphate
  4.8% of waterglass
  1.9% of Mg silicate
  5.0% of sodium carbonate
  1.4% of carboxymethylcellulose
  0.3% of ethylenediaminetetraacetic acid
  34.4% of sodium sulphate.

A solution of the optical brightener of the formula (11) is prepared by dissolving 1 g in 1,000 ml of methylcellosolve. 0.8 ml of this stock solution is added to the solution described above. This aqueous dispersion containing the brightener is warmed to 55°C. 5 g of a polyester fabric are then introduced into the solution and treated at this temperature for 15 minutes. After this wash, the fabric is rinsed firstly with lukewarm water and then with cold water.

The washing process described above is carried out with the same fabric, but a fresh wash liquor in each case, for a total of 15 times. A polyester fabric which shows an attractive white effect in daylight is thereby obtained.

The fact that a good white effect is also obtained on other fibres is shown by the following:

If in the preceding example the 5 g of polyglycol terephthalate fabric are replaced by 5 g of a synthetic polyamide fabric, for example nylon, and in other respects the procedure indicated above is followed, a very attractive white shade is obtained on this fabric also.

If the brightener mentioned, of the formula (11) is replaced by the same amount of an optical brightener of the formula (15), (16), (17), (18), (23), (49) or (56), similar effects are obtained, after the 15-fold wash and otherwise under the same conditions as described above, on polyglycol terephthalate fabrics and on nylon fabrics.

EXAMPLE 14

0.06 g of 40% strength acetic acid and 0.06 g of alkylpolyglycol-ether are added to 100 ml of water.

A solution of the optical brightener of the formula (11) is prepared by dissolving 1 g in 1,000 ml of dimethylformamide. 1.5 ml of this stock solution are added to the solution described above. This aqueous dispersion containing the brightener is warmed to 60°C; 3 g of a polypropylene fabric are then introduced into the solution. The temperature is raised to 95° – 98°C over the course of 10 to 15 minutes and is left thereat for 30 minutes. The fabric is then rinsed for 2 minutes in running cold water and subsequently dried for 20 minutes at 60°C. The fabric treated in this way shows a distinct brighteneing effect.

If instead of the abovementioned brightener the same amounts of a brightener of the formula (15), (16), (17), (49), (53), (54) or (55) are used and otherwise the same procedure is followed, similar effects are obtained.

EXAMPLE 15

100 parts of polypropylene are homogenised with 0.5 part of titanium dioxide and 0.05 part of the optical brightener of the formula (11) in a kneader at 200°C. The melt is spun through spinnerets under an inert gas at 2 to 3 atmospheres gauge and at a temperature of 280° to 300°C in accordance with known methods. The polypropylene filaments thus obtained are distinguished by a high degree of whiteness.

If instead of the abovementioned brightener the same amounts of an optical brightener of the formula (15), (17), (49), (53) or (55) are used and otherwise the same procedure is followed, similar effects are obtained.

EXAMPLE 16

In a kneader, 67 parts of polyvinyl chloride powder, 33 parts of dioctyl phthalate, 2 parts of di-n-butyldilauryldioxystannate, 0.3 part of sodium pentaoctyltripolyphosphate and 0.05 part of the optical brightener of the formula (11) and gelled for 15 minutes on a mixing mill at 160°C and subsequently sheeted. The polyvinyl chloride sheet thus produced shows a strong fluorescence, and a brilliant white appearance, in daylight.

If instead of the abovementioned brightener the same amounts of an optical brightener of the formula (14), (15), (17), (20), (23), (25), (27), (34), (49), (58) or (59) are used and otherwise the same procedure is followed, similar effects are obtained.

EXAMPLE 17

1.000 parts of polyester granules of polyethylene glycol terephthalate are intimately mixed with 0.25 parts of the optical brightener of the formula (11) and then spun in a known manner under nitrogen from an extruder at a temperature of 265° to 285°C through a spinneret to give filaments. The polyester filaments thus obtained show a brilliant white appearance.

If the procedure indicated above is followed but instead of the brightener of the formula (11) equivalent amounts of an optical brightener of the formula (14), (15), (17), (18), (49), (55), (56), (64) or (68) are used and otherwise the same procedure is followed, similar results are obtained.

EXAMPLE 18

388 g of benzene-1,4-dicarboxylic acid dimethyl ester, 300 g of 1,2-ethanediol and 0.4 g of antimony oxide are heated in a stainless steel autoclave, equipped with a stirrer, a gas inlet tube, a vacuum device, a descending condenser and a heating jacket, to 200°C external temperature whilst blowing pure nitrogen through the mixture, and are kept at this temperature for 3 hours. In the course thereof, the methanol slowly distils off. 0.4 g of the optical brightener of the formula (11), dissolved in 40 g of 1,2-ethanediol. are now carefully introduced into the autoclave with exclusion of air, after the temperature has been allowed to drop to 190°C. After completion of the addition, the temperature is raised to 285°C external temperature over the course of 1 hour, whereupon 1,2-ethanediol distils off. Thereafter vacuum is applied to the autoclave, the pressure is slowly reduced to 0.2 mm Hg, and the condensation is completed under these conditions over the course of 3 hours. During this operation the mixture is thoroughly stirred.

The liquid condensation polymer is then extruded through the bottom nozzle by means of nitrogen. Monofilaments, which show a brilliant white appearance, can be manufactured from the polymer thus obtained.

Similar effects are obtained if, whilst otherwise using the same procedure, equal amounts of an optical brightener of the formula (14), (15), (17), (18), (49), (55), (56) or (64) are used instead of the abovementioned brightener.

EXAMPLE 19

400 parts of caprolactam. 40 parts of water, 0.4 part of the brightener of the formula (11) and 1.6 parts of titanium dioxide (anatase) are mixed with one another and warmed to about 70°C until the mass liquefies. The liquid mixture is introduced into a stainless steel pressure vessel and is heated, with exclusion of oxygen, to a temperature of about 250°C over the course of 1 hour, during which a pressure of 10 to 15 atmospheres is generated. After this time, the water is distilled off and the polymeric mass is subsequently kept for 3 hours at 250°C, without application of pressure, in order to degas it completely. In the course thereof, the mass reaches a viscosity which allows the polymer to be extruded in the form of strips or filaments, by means of nitrogen, through a nozzle mounted at the bottom of the pressure vessel. The solidifed polyamide is freed of monomeric constituents by extraction with water. The polyamide fibre obtained by this process is distinguished by a very high degree of whiteness.

If instead of the brightener of the formula (11) the same amounts of an optical brightener of the formula (15), (32), (34), (35) or (53) are used, similar results are obtained.

EXAMPLE 20

1,000 parts of polyamide chips, obtained in a known manner from hexamethylene adipate are mixed with 5 parts of titanium dioxide and 0.5 part of the optical brightener of the formula (11) in a drum for 10 to 16 hours. The chips treated in this way are fused in an apparatus with exclusion of oxygen and stirred for a short time. Thereafter the melt is spun through spinnerets under a nitrogen atmosphere of 5 atmospheres gauge, and the product is stretched. The polyamide filaments thus obtained show a high degree of whiteness.

Similar effects are obtained if, whilst otherwise following the same procedure, equal amounts of an optical brightener of the formula (15), (32), (34), (35) or (53) are used instead of the brightener of the formula (11).

We claim:

1. A detergent characterized in that it contains from 0.001 to 0.5 percent by weight of an optical brightener of the formula

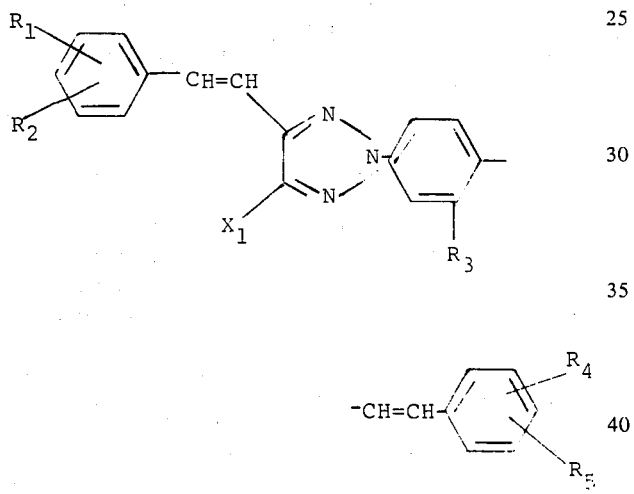

wherein
- $X_1$ denotes hydrogen, halogen, methyl or optionally substituted phenyl,
- $R_1$ denotes hydrogen, halogen, alkyl with 1 to 4 carbon atoms, optionally substituted phenyl or alkoxy with 1 to 4 carbon atoms, or together with $R_2$ in the o-position denotes a fused benzene ring,
- $R_2$ denotes hydrogen, halogen, alkyl with 1 to 4 carbon atoms or alkoxy with 1 to 4 carbon atoms, or together with $R_1$ in the o-position denotes a fused benzene ring,
- $R_3$ denotes hydrogen, a nitrile group, an optionally functionally modified sulpho group or an optionally functionally modified carboxyl group,
- $R_4$ denotes hydrogen, halogen, a nitrile group, alkyl with 1 to 4 carbon atoms, optionally substituted phenyl, alkoxy with 1 to 4 carbon atoms, optionally functionally modified carboxyl or an optionally functionally modified sulpho group and
- $R_5$ denotes hydrogen, alkyl with 1 to 4 carbon atoms or alkoxy with 1 to 4 carbon atoms.

2. A detergent composition according to claim 1 wherein the optical brightener is of the formula

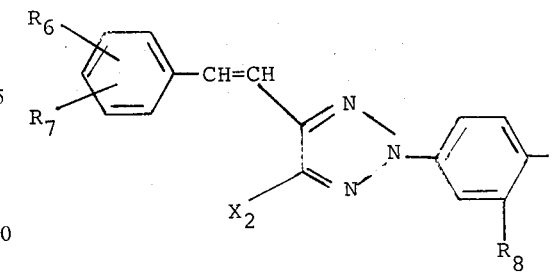

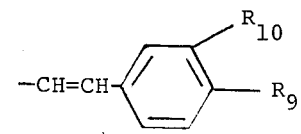

wherein
- $X_2$ denotes hydrogen or chlorine,
- $R_6$ denotes hydrogen, chlorine, bromine, alkyl with 1 to 4 carbon atoms or phenyl,
- $R_7$ denotes hydrogen, chlorine, alkyl with 1 to 4 carbon atoms or alkoxy with 1 to 4 carbon atoms,
- $R_8$ denotes hydrogen, a nitrile group, an optionally functionally modified sulphonic acid group or an optionally functionally modified carboxyl group,
- $R_9$ denotes hydrogen, chlorine, alkyl with 1 to 4 carbon atoms, alkoxy with 1 to 4 carbon atoms, phenyl, optionally functionally modified carboxyl or an optionally functionally modified sulpho group and
- $R_{10}$ denotes hydrogen, alkyl with 1 to 4 carbon atoms or alkoxy with 1 to 4 carbon atoms.

3. A detergent composition according to claim 1, wherein the optical brightener is of the formula

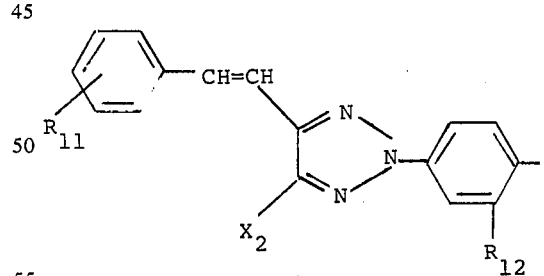

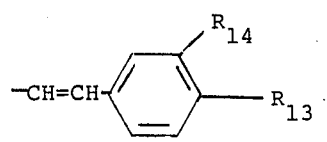

wherein
$X_2$ denotes hydrogen or chlorine, $R_{11}$ denotes hydrogen, alkyl with 1 to 4 carbon atoms, chlorine, methoxy or phenyl, $R_{12}$ denotes carbonamido, a nitrile group, a sulpho group or its sodium salt, —$SO_2Y$, wherein Y represents methyl, ethyl, methoxy, ethoxy, phenoxy optionally substituted by alkyl with 1 to 4 carbon atoms or an alkylamino group with 1 to 4 carbon atoms, wherein the terminal carbon atom can be substituted by a dialkylamino group with 1 or 2 carbon atoms per alkyl part, $R_{13}$ denotes hydrogen, chlorine, methyl, methoxy, phenyl, carbomethoxy or carbethoxy and $R_{14}$ denotes hydrogen or methoxy.

\* \* \* \* \*